United States Patent
Li et al.

(10) Patent No.: US 8,541,332 B2
(45) Date of Patent: Sep. 24, 2013

(54) CATALYST FOR POLYMERIZATION OF OLEFINS COMPRISING THIENYL-SUBSTITUTED SILANES

(75) Inventors: Zhifei Li, Beijing (CN); Kuilong Tan, Beijing (CN); Hao Wang, Beijing (CN); Jianjun Yi, Beijing (CN); Qinghong Xu, Beijing (CN); Weisong Cui, Beijing (CN); Wei Bai, Beijing (CN); Xinyuan Liu, Beijing (CN); Pu Xu, Beijing (CN); Wanqing Ju, Beijing (CN)

(73) Assignee: PetroChina Company Limited (CN)

( * ) Notice: Subject to any disclaimer, the term of this patent is extended or adjusted under 35 U.S.C. 154(b) by 0 days.

(21) Appl. No.: 13/813,479

(22) PCT Filed: Jun. 3, 2011

(86) PCT No.: PCT/CN2011/000943
§ 371 (c)(1),
(2), (4) Date: Jan. 31, 2013

(87) PCT Pub. No.: WO2012/142732
PCT Pub. Date: Oct. 26, 2012

(65) Prior Publication Data
US 2013/0131292 A1 May 23, 2013

(30) Foreign Application Priority Data

Apr. 22, 2011 (CN) .......................... 2011 1 0102200

(51) Int. Cl.
*C08F 4/02* (2006.01)
*C08F 4/44* (2006.01)
*C08F 2/00* (2006.01)
*C08F 4/00* (2006.01)
*B01J 27/02* (2006.01)
*B01J 21/00* (2006.01)

(52) U.S. Cl.
USPC ........... 502/122; 502/158; 502/168; 502/216; 502/232; 526/128; 526/140; 526/222; 526/234

(58) Field of Classification Search
USPC ................. 502/116, 122, 158, 168, 216, 232; 526/128, 140, 222, 234
See application file for complete search history.

(56) References Cited

U.S. PATENT DOCUMENTS

| 4,562,173 A | * | 12/1985 | Terano et al. ............ 502/127 |
| 4,927,797 A | | 5/1990 | Ewen |
| 5,166,340 A | | 11/1992 | Stewart |

(Continued)

FOREIGN PATENT DOCUMENTS

CN  1176258 A  3/1998

(Continued)

OTHER PUBLICATIONS

"International Application No. PCT/CN2011/000943, International Search Report mailed Feb. 2, 2012 [with English translation]", (Feb. 2, 2012), 8 pgs.

*Primary Examiner* — David W Wu
(74) *Attorney, Agent, or Firm* — Schwegman, Lundberg & Woessner, P.A.

(57) ABSTRACT

Disclosed is a catalyst for the polymerization of olefins comprising thienyl-substituted silanes, which comprises a solid titanium catalyst component containing titanium, magnesium and a halogen as the main components, an alkylaluminum compound, and a component of organosiloxane compound comprising two thienyl as substituents represented by general formula (I). The molar ratio of each catalyst component is 1:50-150:5-50 based on titanium:aluminum:silicon. When the catalyst is used in the polymerization of propylene, the polymerisate obtained has a very high degree of isotacticity, and the yield is high.

general formula (I)

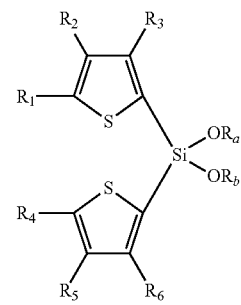

5 Claims, 3 Drawing Sheets

(56) References Cited

U.S. PATENT DOCUMENTS 5,192,732 A    3/1993  Duranel et al.
5,498,770 A *  3/1996  Hosaka et al. ................ 502/116

FOREIGN PATENT DOCUMENTS

| | | | |
|---|---|---|---|
| EP | 0 350 170 | A2 | 1/1990 |
| EP | 0 419 249 | A2 | 3/1991 |
| EP | 0 565 173 | A1 | 10/1993 |
| EP | 0 657 476 | A2 | 6/1995 |
| EP | 0 844 260 | A1 | 5/1998 |
| GB | 694440 | * | 6/1953 |
| GB | 694440 | | 7/1953 |

* cited by examiner

CATALYST FOR POLYMERIZATION OF OLEFINS COMPRISING THIENYL-SUBSTITUTED SILANES

PRIORITY CLAIM TO RELATED APPLICATIONS

This application is a national stage application under 35 U.S.C. §371 of PCT/CN2011/000943, filed Jun. 3, 2011, and published as WO 2012/142732 A1 on Oct. 26, 2012, which claims priority to Chinese Application No. 201110102200.4, filed Apr. 22, 2011, which applications and publication are incorporated by reference as if reproduced herein and made a part hereof in their entirety, and the benefit of priority of each of which is claimed herein.

FIELD OF THE INVENTION

The present invention relates to an olefin polymerization catalyst containing thienyl-substituted silane.

BACKGROUND OF THE INVENTION

In prior art, in Ziegler-Natta catalysts for olefin polymerization or copolymerization, an active component generally contains titanium, magnesium and halogen as main components, and when being used in polymerization, a promoter aluminum alkyl compound and an external electron donor component are added. For stereospecific polymerization of olefins, especially stereospecific polymerization of propylene, if no external electron donor is added, the isotacticity of the polymer resulted by using most of the catalysts is low, and generally lower than 90%, which has adverse effects on industrial production and application of the polymer. Therefore, for most of the catalysts for propylene polymerization, addition of the external electron donors plays an important role.

Currently, the types of external electron donor have been extended from original benzoate esters to presently extensively used organosiloxanes. U.S. Pat. No. 4,562,173 discloses a catalyst component for polymerization of olefins, which contains an organosiloxane compound represented by general formula $SiR_m(OR')_{4-m}$, where R is hydrogen, alkyl or aryl, R' is alkyl or aryl, and m is in the range of 0 to 4. The embodiments disclosed in the patent demonstrate that, by using phenyltriethoxysilane as the external electron donor for propylene polymerization, the isotacticity of the product polypropylene is significantly higher than that of the product obtained by using ethyl p-methyl benzoate as the external electron donor in comparative embodiment. U.S. Pat. No. 4,927,797 discloses an external electron donor represented by general formula $R_1(OR_2)Si(OR_3)R_4$ that used with a specified Toho-type titanium magnesium catalyst system in pair, where $R_1$ is alkyl or cycloalkyl with large steric hindrance and containing at least one secondary carbon or tertiary carbon atom, $R_2$ and $R_3$ are alkyl or aryl, and $R_4$ is alkyl carrying primary carbon atom and directly connected to Si atom. Preferably, $R_1$ is cyclohexyl or tert-butyl; $R_2$ and $R_3$ are methyl, ethyl, propyl or butyl, and may be the same or different; $R_4$ is a group containing 1 to 6 carbon atoms. More preferably, the compound is cyclohexylmethyldimethoxysilane. The embodiments disclosed in the patent demonstrate that, compared with diphenyldimethoxysilane, using cyclohexylmethyldimethoxysilane as the external electron donor of the specified catalyst has the advantages of smoothness in isotacticity adjustment and hydrogen control, and slow attenuation, thus facilitating stable operation of the industrial unit. Patent No. EP0350170 discloses a process for polymerizing olefins and a polymerization catalyst therefore. The catalyst contains an external electron donor represented by general formula $SiR^{21}R^{22}_m(OR^{23})_{3-m}$, where $R^{21}$ is cyclopentyl, cyclopentenyl or cyclopentadienyl and groups derived therefrom, $R^{22}$ and $R^{23}$ each represented a hydrocarbon group and may be same or different, $0 \leq m \leq 3$. The compound was preferably dicyclopentyldimethoxysilane. The embodiments in the patent demonstrate that, when being used in propylene homopolymerization, the catalyst has the advantages of high activity and high polymer isotacticity; and when being used in preparation of randomly copolymerized polypropylene film material, the catalyst has the advantages of high ethylene content, low initial heat sealing temperature, and high transparency. Patent No. CN1176258 discloses a catalyst system for propylene polymerization and copolymerization and a polymerization method. The catalyst system contains the Ziegler-Natta catalyst in combination with an external electron donor represented by general formula $SiR_m(OR')_{4-m}$ that are conventionally loaded on a carrier, where R is a group selected from alkyl, cycloalkyl, aryl and vinyl; R' is alkyl; m is 0-3, when R is alkyl, R and R' may be the same; when m is 0, 1 or 2, R' may be the same or different; and when m is 1, 2 or 3, R may be same or different. Particularly, the external electron donor in the catalyst system may be selected from cyclohexylmethyldimethoxysilane, diisobutyldimethoxysilane, di-tert-butyldimethoxysilane, cyclohexylisopropyldimethoxysilane or dicyclopentyldimethoxysilane. The catalyst system has high activity and can desirably control the content of xylene solubles in the polymer to be in the range of 0.6 wt % to 3.0 wt %, thereby providing the polypropylene product with high degree of crystallinity. The external electron donor is preferably dicyclopentyldimethoxysilane. The embodiments disclosed in the patent demonstrate that, compared with several other external electron donors, dicyclopentyldimethoxysilane has the advantages of the lowest content of xylene solubles in the polymerization product and the highest isotacticity. In addition, Patent Nos. EP0419249, EP0565173, EP0657476, EP0844260, U.S. Pat. No. 5,166, 340, U.S. Pat. No. 5,192,732 disclose external electron donors of organosiloxane types for catalytic olefin polymerization, all of which are incorporated herein by reference.

Although the external electron donors of organosiloxane type used for catalytic olefin polymerization have been reported in many published patents, and the typical external electron donors with cyclohexylmethyldimethoxysilane and diphenyldimethoxysilane as representative have been widely used in industrial production of polypropylene, the isotacticity of the polymers are generally in the range of 95% to 99%, for stereospecific polymerization of olefins, especially stereo specific polymerization of propylene, in the prior art. Further improvement of the isotacticity of the polymerization products still has great significance for production of some special products with high crystallinity and rigidity, so as to further improve mechanical properties of the polymer materials.

SUMMARY OF THE INVENTION

The present invention is directed to an olefin polymerization catalyst containing thienyl-substituted silane, which uses a type of organosiloxane compounds containing two thienyl substituents as external electron donors for catalytic polymerization of olefin, and is particularly used in propylene polymerization, so as to provide a polymerization product with very high isotacticity at a high yield.

The olefin polymerization catalyst containing thienyl-substituted silane according to the present invention is a product of a reaction of the following components:

(A) a solid titanium catalyst component, with titanium, magnesium and halogen as main components;

(B) an aluminum alkyl compound component, and (C) an organosiloxane compound component containing two thienyl substituents, selected from at least one of compounds represented by General Formula (I) below:

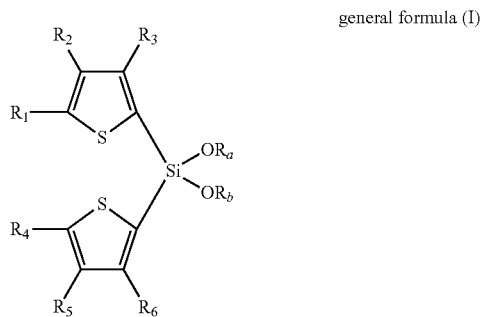

general formula (I)

in which $R_1$ to $R_6$ are the same or different, and are selected from hydrogen, halogen, linear or branched $C_1$-$C_{20}$ alkyl, $C_3$-$C_{20}$ cycloalkyl, $C_6$-$C_{20}$ aryl, $C_7$-$C_{20}$ alkylaryl or $C_7$-$C_{20}$ aralkyl; and two or more of $R_1$ to $R_6$ may be bonded with each other to form a saturated or unsaturated condensed ring structure which may be substituted by a group with the same definition as $R_1$ to $R_6$; $R_1$ to $R_6$ optionally contain one or more heteroatoms substituted for carbon or hydrogen atoms or both, the heteroatom is selected from nitrogen, oxygen, sulfur, silicon, phosphorus or a halogen atom; and $R_a$ and $R_b$ are the same or different, and are selected from linear or branched $C_1$-$C_4$ alkyl.

Preferably, in general formula (I), $R_1$ to $R_6$ are the same or different, and are selected from hydrogen atom, methyl, ethyl, propyl and isopropyl; and $R_a$ and $R_b$ are the same or different, and are methyl or ethyl.

More preferably, in general formula (I), $R_1$ to $R_6$ are the same or different, and are selected from hydrogen atom and methyl; and both $R_a$ and $R_b$ are methyl.

The external electron donor compound involved in the preparation process of the present invention is synthesized in the following principle: halogenated thiophene or a derivative RX thereof and magnesium powder undergo a Grignard reaction in the presence of a catalyst, to give RMgX; and then the RMgX is reacted with tetraalkoxysilane with $R_a$ or $R_b$ as an optional substituent in a solvent, to provide the disubstituted thienyldialkoxysilane as a target product. The two steps of reactions are completed in the same reactor. In reaction, the catalyst is iodine, and the solvent is tetrahydrofuran which can be recovered for reuse.

The reactor used in the process of synthesizing the external electron donor compound in the present invention is one equipped with a reflux condenser tube, a thermometer, a stirrer, a heater and a balanced feeder.

Tetrahydrofuran and halogenated thiophene used in the overall process of experiment have been subjected to strict deaerating and dewatering treatment. The dewatering method is as follows: tetrahydrofuran or halogenated thiophene is fed into a round flask of a reflux unit, and then a rotor is added for stirring; sodium metal is cut into thin slices and added into the flask; the mixed system is heated until no bubble is released, and then the liquid is distilled and dried. The unreacted sodium metal is treated with absolute ethanol. The deaerating method is as follows: tetrahydrofuran or halogenated thiophene is fed into a Schlenk flask, and then the Schlenk flask containing the liquid is placed into liquid nitrogen and frozen and taken out after the liquid is solidified, and then is deaerated by using a vacuum pump. After the solid in the flask is fluidized at room temperature, nitrogen gas is filled, and then freezing in liquid nitrogen is continued. The operation is repeated three times.

The specific preparation is as follows: with protection of nitrogen gas, magnesium powder, a tetrahydrofuran solvent, tetraalkoxysilane and an iodine initiator are added to a three-necked flask equipped with a stirrer, a reflux condenser tube and a thermometer. Pure halogenated thiophene is added at reflux with stirring to initiate reaction. After the reaction is initiated, a mixed liquid of remaining tetrahydrofuran and halogenated thiophene is added slowly at reflux with stirring. After addition, the system is refluxed for several hours, and then heating is stopped, and the reaction mixture is stirred continuously until the reaction mixture is cooled to room temperature. The reaction mixture is filtered for separation by using a filter tube with protection of nitrogen gas, and the cake is washed with the dewatered and deaerated tetrahydrofuran. The resulting filtrate is subjected to distillation at normal pressure and distillation at reduced pressure with protection of nitrogen gas, so as to provide the target product. The structure and purity of the target product are detected by using an infrared spectrophotometer, a nuclear magnetic resonance spectrometer and an elementary analyzer.

The experimental feeding added in the process of preparation includes: the material for initiation and the dropping added materials. Whether the Grignard reaction is initiated is associated with the amount of halogenated thiophene added as the material for initiation. If the amount of halogenated thiophene is excessively small, it is difficult to initiate the reaction; and if the amount of halogenated thiophene is excessively large, flushing easily occurs, thus being dangerous. The amount of halogenated thiophene in the material for initiation in the present invention accounts for 3% to 20%, and preferably 5% to 10% by weight of total halogenated thiophene.

In the present invention, a molar ratio of tetraalkoxysilane to halogenated thiophene is 1:2-2.4, and preferably 1:2.1-2.2; and a molar ratio of tetraalkoxysilane to magnesium powder is 1:2-2.8, preferably 1:2.1-2.6.

In the present invention, tetrahydrofuran is used as the solvent. The amount of tetrahydrofuran is not particularly limited, provided that the amount is sufficient to dissolve the reactant, and a mass ratio of tetrahydrofuran to magnesium powder is generally 2 to 20.

In the present invention, iodine is used as the initiator. The amount of iodine is not particularly limited, provided that the amount is sufficient to initiate the reaction, and a mass ratio of iodine to magnesium powder is generally 0.01 to 0.1.

In the present invention, the solid titanium catalyst component with titanium, magnesium and halogen as a main component may be prepared according to the following methods.

In one method, magnesium halide alcoholate is prepared from an alcohol, magnesium halide and a hydrocarbon solvent in the presence of a carboxylic acid anhydride compound. Next, the homogeneous alcoholate solution is contacted with the liquid titanium compound, and then the temperature is raised. Based on recrystallization of magnesium halide in the titanium compound when the temperature is raised from a low temperature to a high temperature, a certain amount of an internal electron donor compound is added for reaction when the temperature is raised. The temperature is continuously raised, and when the reaction temperature is reached, a certain amount of the internal electron donor compound is further added for reaction. The reactant is filtered, washed and dried, to provide the solid titanium catalyst. For more specific preparation method, reference can be made to Patent Publication No. ZL02148336.1.

In another method, spherical magnesium chloride alcoholate particles represented by general formula $MgCl_2 \cdot nROH$ are added to a titanium tetrachloride solution at a low temperature, and reacted for a period of time. Next, the temperature is gradually raised to 40° C. to 100° C., one or two internal electron donors are added, and continuously reacted for a period of time. The reactant is filtered, a certain amount of titanium tetrachloride is added, and reacted for a period of time. The step of adding titanium tetrachloride and filtering may be repeated 1 to 3 times. Finally, the filter residue is washed with an inert hydrocarbon solvent and dried, to provide the spherical solid catalyst. For more specific preparation method, reference can be made to Patent Publication No. ZL94103454.2.

In the preparation methods of the catalysts, the internal electron donor compound is selected from polybasic carboxylic acid esters, anhydrides, ketones, ethers, sulfonyl compounds, and so on.

In the present invention, the aluminum alkyl compound component is preferably a compound represented by general formula $AlR_nX_{(3-n)}$, in which R is hydrogen or $C_{1-20}$ alkyl, aralkyl, aryl; X is halogen; n is an integer of 1 to 3. Particularly, the aluminum alkyl compound may be selected from trimethylaluminum, triethylaluminum, triisobutylaluminum, trioctylaluminum, aluminum diethyl monohydride, aluminum diisobutyl monohydride, aluminum diethyl monochloride, aluminum diisobutyl dichloride, aluminum ethyl dichloride, and so on, with triethyl aluminum and triisobutyl aluminum being preferred.

In the present invention, a molar ratio of the components (A), (B) and (C) in the catalyst is 1:5-1000:0-500; preferably 1:50-150:5-50, based on titanium:aluminum:silicon.

The olefin polymerization and copolymerization of the present invention are carried out in liquid bulk or in a solution of the bulk in the inert solvent or in gas phase, or by a combined polymerization process in gas-liquid phase, according to the methods well-known in the art. The polymerization temperature is generally 0° C. to 150° C., preferably 50° C. to 100° C. The polymerization pressure is normal pressure or higher.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION OF THE INVENTION

Test Method

1. An elementary analysis, an infrared spectroscopy and $^{13}C$ nuclear magnetic resonance method are used to detect the structure and purity of the synthesized external electron donor compound.

2. A boiling n-heptane extraction method is used to detect the isotacticity of the polymerization product, according to National Standard GB 2412-80.

3. A melting index of the polymerization product is detected according to National Standard GB/T 3682-2000.

Embodiment 1

(1) Synthesis of dithienyldimethoxysilane

Figure 1:
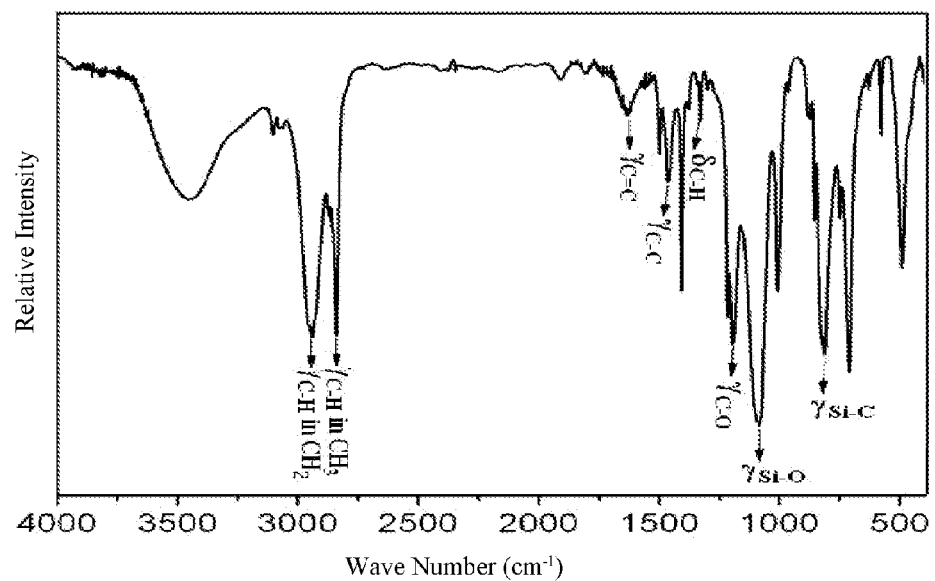
FIG. 1 is an infrared spectrum of dithienyldimethoxysilane.
Figure 2:
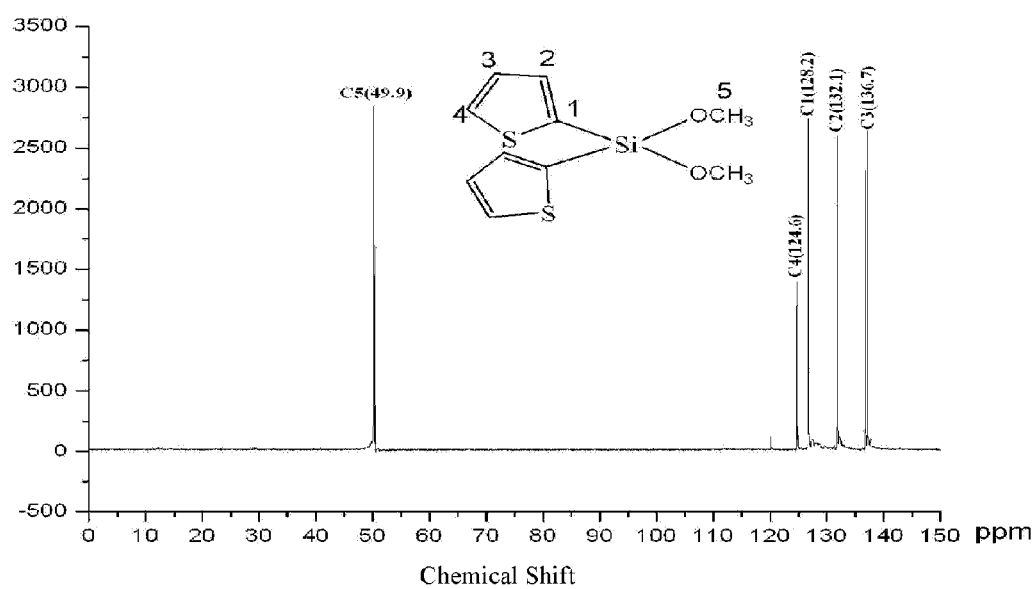
FIG. 2 is a $^{13}C$ nuclear magnetic resonance spectrum of dithienyldimethoxysilane.

With protection of nitrogen gas, 5.34 g magnesium powder, 1.62 g bromothiophene and 20 ml tetrahydrofuran were added to a 250 ml three-necked flask equipped with a stirrer, a reflux condenser tube and a thermometer. After the mixed system was refluxed for 0.5 hour, 0.26 g iodine was added until the reaction got severe. After the reaction was stable, a mixed solution of 32.6 g bromothiophene, 60 ml tetrahydrofuran and 15.20 g tetramethoxysilane was added dropwise from an upper part of tube within about 2 hours. After being heated with stirring and refluxing for 5 hours, the mixed system was slowly cooled to room temperature, filtered by a filter tube with protection of nitrogen gas, and the solid substance was washed with tetrahydrofuran several times. The resulting filtrate was subjected to distillation at normal pressure and solvent recovery, and then subjected to distillation at reduced pressure. The product at 130° C. to 131° C. and 25 mmHg column pressure were collected, and subjected to elementary analysis, infrared spectroscopy and $^{13}C$ nuclear magnetic resonance test. The infrared spectrum and nuclear magnetic resonance spectrum are shown in FIG. 1 and FIG. 2 respectively. The infrared spectrum preliminarily approves the occurrence of the synthetic reaction, and the $^{13}C$ nuclear magnetic resonance spectrum effectively demonstrates the formation of the products. The results of elementary analysis indicate that, in the synthesized products, the content of C is 46.04% and the content of H is 5.37%, which are substantially identical with the theoretical C content of 46.51% and theoretical H content of 5.43% of dithienyldimethoxysilane, thereby further approving the synthesis of the product dithienyldimethoxysilane.

(2) Preparation of titanium-containing solid catalyst 5.0 g spherical carrier $MgCl_2 \cdot 2.85C_2H_5OH$ was charged to a glass reactor equipped with a stirrer which was charged with 150 ml $TiCl_4$ and cooled to −25° C. in advance, and the temperature was gradually raised to 80° C. 2 mmol internal electron donor diisobutyl phthalate was added, and the temperature was kept at 80° C. for 30 minutes, and then raised to 130° C., and the reaction was carried out for 2 hours. The reactant was filtered, 120 ml $TiCl_4$ was added and reacted for 2 hours at 130° C., and filtered. The step of adding TiCl4 and filtration were repeated once. The filter residue was washed with n-hexane 6 times, and finally the solid material was dried under vacuum, to provide 3.2 g spherical solid catalyst component of the present invention.

(3) Experiment of propylene polymerization

To a 2 L stainless steel autoclave that had been fully rinsed with gaseous propylene, 5 ml, 2.4 mol/L triethylaluminum solution, 0.9 mmol synthesized dithienyldimethoxysilane as the external electron donor compound, 20.5 mg titanium-containing solid catalyst component prepared above and 500 g liquid propylene were added in sequence. The temperature was raised to 70° C., and reaction was carried out for 0.5 hour at this temperature. The reactant was cooled, released and discharged, to provide the polypropylene product.

Embodiment 2

(1) Synthesis of dithienyldimethoxysilane

With protection of nitrogen gas, 3.50 g magnesium powder, 1.30 g bromothiophene and 20 ml tetrahydrofuran were added to a 250 ml three-necked flask equipped with a stirrer, a reflux condenser tube and a thermometer. After the mixed system was refluxed for 0.5 hour, 0.26 g iodine was added until the reaction got severe. After the reaction was stable, a mixed solution of 20.74 g bromothiophene, 60 ml tetrahydrofuran and 9.99 g tetramethoxysilane was added dropwise from an upper part of tube within about 2 hours. After being heated with stirring and refluxing for 5 hours, the mixed system was slowly cooled to room temperature, filtered by a filter tube with protection of nitrogen gas, and the solid substance was washed with tetrahydrofuran several times. The resulting filtrate was subjected to distillation at normal pressure and solvent recovery, and then subjected to distillation at reduced pressure. The product at 130° C. to 131° C. and 25 mmHg column pressure were collected. Te infrared spectrum and $^{13}$C nuclear magnetic resonance spectrum of the synthesized compound are substantially identical with that in FIG. 1 and FIG. 2. The infrared spectrum preliminarily approves the occurrence of the synthetic reaction, and the $^{13}$C nuclear magnetic resonance spectrum effectively demonstrates the formation of the product.

(2) Preparation of the titanium-containing solid catalyst

To a three-necked flask that had been rinsed with nitrogen gas, 5 g anhydrous MgCl$_2$ was poured, 27 ml n-decane and 23.0 ml isooctyl alcohol were added, heated to 130° C. with stirring, and reacted at 130° C. for 3 hours. 1.17 g phthalic anhydride was added, and continued to react at 130° C. for 1 hour. After the reaction was completed, the reactant was cooled to room temperature, to give a stable and homogenous solution of alcoholate. To a reactor that had been fully rinsed by nitrogen gas and charged with 200 ml titanium tetrachloride of −25° C., the homogenous solution prepared above was added dropwise over 1 hour,. After addition, the temperature was raised to 60° C. in 3 hours, 1.5 ml diisobutyl phthalate was added, and the temperature was continuously raised for 30 min to 110° C. 2.1 ml diisobutyl phthalate was added and reacted for 2 hours at 110° C. After the reaction was completed, the liquid was filtered, and another 200 ml titanium tetrachloride was added, and reacted for 2 hours at 110° C. After the reaction was completed, the reaction liquid was filtered, and the filter residue was washed with hot hexane that is dried by molecular sieve, and the remaining solid was dried in vacuum, to provide the solid catalyst.

(3) Experiment of propylene polymerization

To a 2 L stainless steel autoclave that had been full rinsed by gaseous propylene, 5 ml, 2.4 mol/L triethylaluminum solution, 0.9 mmol synthesized dithienyldimethoxysilane as the external electron donor compound, 18.8 mg titanium-containing solid catalyst component prepared above and 500 g liquid propylene were added in sequence, heated up to 70° C. and reacted for 0.5 hour at this temperature, cooled, released and discharged, to provide the polypropylene product.

Embodiment 3

(1) Synthesis of dithienyldimethoxysilane: the same as that in Embodiment 1

(2) Preparation of the titanium-containing solid catalyst: the same as that in Embodiment 1

(3) Experiment of propylene polymerization

To a 2 L stainless steel autoclave that had been fully rinsed by gaseous propylene, 5 ml, 2.4 mol/L triethylaluminum solution, 0.45 mmol synthesized dithienyldimethoxysilane as the external electron donor compound, 19.3 mg titanium-containing solid catalyst component prepared above and 500 g liquid propylene were added in sequence, heated up to 70° C. and reacted for 0.5 hour at this temperature, cooled, released and discharged, to provide the polypropylene product.

Embodiment 4

(1) Synthesis of dithienyldimethoxysilane: the same as that in Embodiment 1

(2) Preparation of the titanium-containing solid catalyst: the same as that in Embodiment 1

(3) Experiment of propylene polymerization

To a 2 L stainless steel autoclave that had been fully rinsed by gaseous propylene, 5 ml, 2.4 mol/L triethylaluminum solution, 1.8 mmol synthesized dithienyldimethoxysilane as the external electron donor compound, 22.4 mg titanium-containing solid catalyst component prepared above and 500 g liquid propylene were added in sequence, heated up to 70° C. and reacted for 0.5 hour at this temperature, cooled, released and discharged, to provide the polypropylene product.

Embodiment 5

(1) Synthesis of dithienyldimethoxysilane: the same as that in Embodiment 1

(2) Preparation of the titanium-containing solid catalyst: the same as that in Embodiment 1

(3) Experiment of propylene polymerization

To a 2 L stainless steel autoclave that had been fully rinsed by gaseous propylene, first, hydrogen gas was charged at normal pressure, until the pressure in the autoclave reached 0.1 MPa, and then 5 ml, 2.4 mol/L triethylaluminum solution, 0.9 mmol synthesized dithienyldimethoxysilane as the external electron donor compound, 20.7 mg titanium-containing solid catalyst component prepared above and 500 g liquid propylene were added in sequence, heated up to 70° C. and reacted for 0.5 hour at this temperature, cooled, released and discharged, to provide the polypropylene product.

Embodiment 6

(1) Synthesis of dithienyldimethoxysilane

Figure 3:
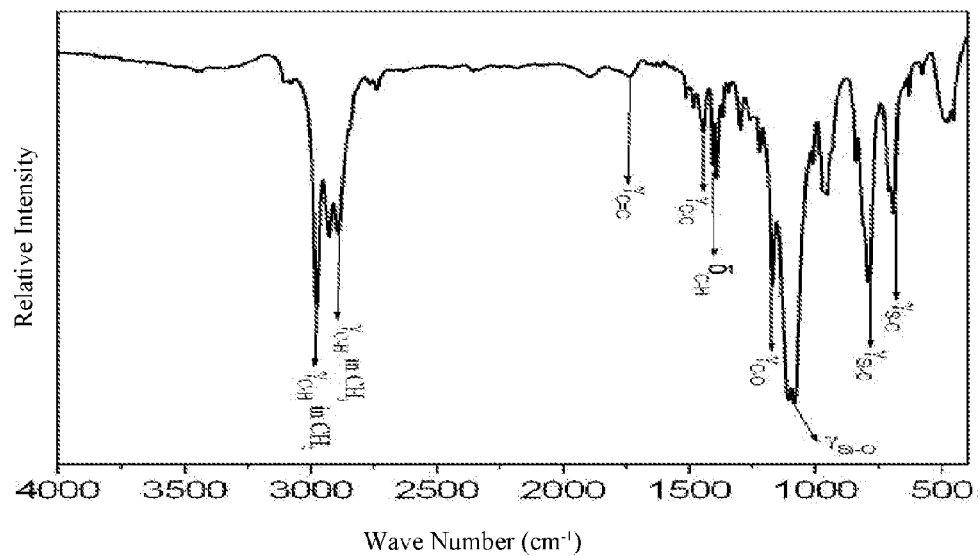
FIG. 3 is an infrared spectrum of dithienyldiethoxysilane.
Figure 4:
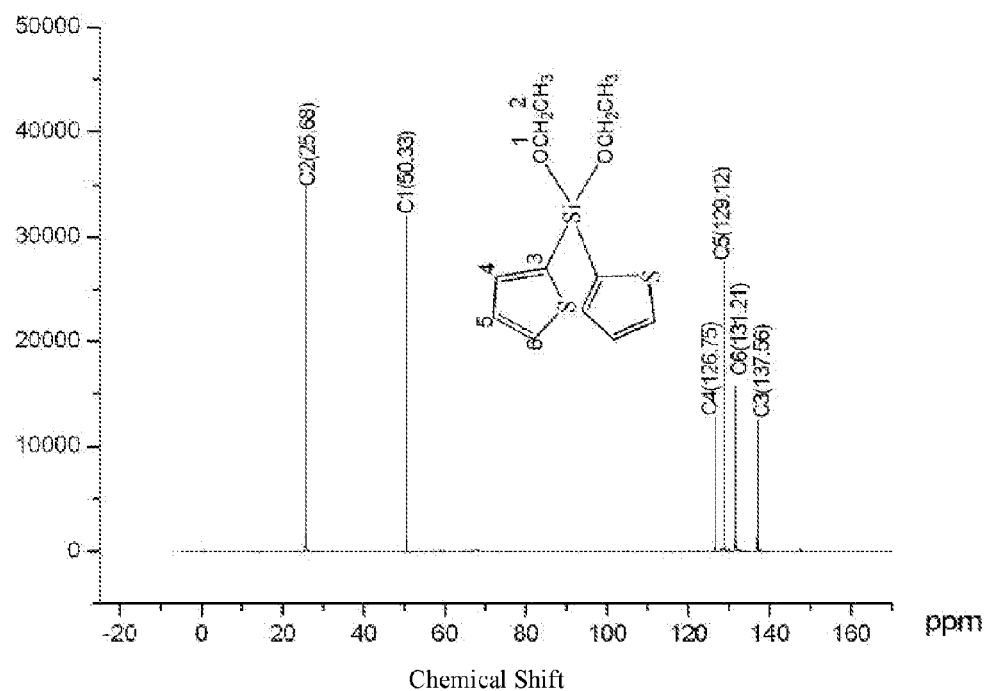
FIG. 4 is a $^{13}C$ nuclear magnetic resonance spectrum of dithienyldiethoxysilane.

With protection of nitrogen gas, to a dry 250 ml three-necked flask that had been rinsed by nitrogen and equipped with a reflux condenser tube and a constant pressure dropping funnel, 5.28 g magnesium powder, 30 ml tetrahydrofuran and 24.6 ml tetraethoxysilane were added. 23 ml bromothiophene was added to the dropping funnel; an appropriate amount of pure bromothiophene was added dropwise as an initiation material with stirring, and tetrahydrofuran was automatically boiled and refluxed. If no reaction occurred, a small amount of iodine was added for initiation. To the remaining bromothiophene, 30 ml tetrahydrofuran was added for dilution to formulate a solution to be added dropwise. After the reaction was initiated, the ingredients were added dropwise within about 2 hours, and the charging rate was controlled such that tetrahydrofuran was slightly boiled. After dropping addition, the reactant was heated in an oil-bath to 40° C. and reacted for 8 hours at this temperature. After the reaction was completed, the reactant was cooled and left to stand, filtered by suction with protection of nitrogen gas, and the cake was washed. The resulting filtrate was subjected to distillation at normal pressure and then subjected to distillation at reduced pressure. The distillates at 130° C. to 132° C. and 20 mmHg column pressure were collected, and subjected to elementary analysis, infrared spectrum and $^{13}$C nuclear magnetic resonance test. The infrared spectrum and nuclear magnetic resonance spectrum are shown in FIG. 3 and FIG. 4 respectively. The infrared spectrum preliminarily approves the occurrence of the synthetic reaction, and the $^{13}$C nuclear magnetic resonance spectrum effectively demonstrates the formation of the products. The results of elementary analysis indicate that, in the synthesized products, the content of C is 50.14% and the content of H is 5.72%, which are substantially identical with to theoretical C content of 50.07% and theoretical H content of 5.63% of dithienyldiethoxysilane, thereby further approving the synthesis of the product dithienyldiethoxysilane.

(2) Preparation of the titanium-containing solid catalyst: the same as that in Embodiment 1

(3) Experiment of propylene polymerization

To a 2 L stainless steel autoclave that had been fully rinsed by gaseous propylene, 5 ml, 2.4 mol/L triethylaluminum solution, 0.9 mmol synthesized dithienyldiethoxysilane as the external electron donor compound, 33.5 mg titanium-containing solid catalyst component prepared above and 500 g liquid propylene were added in sequence, heated up to 70°

C. and reacted for 0.5 hour at this temperature, cooled, released and discharged, to provide the polypropylene product.

Embodiment 7

(1) Synthesis of dithienyldimethoxysilane: the same as that in Embodiment 6

(2) Preparation of the titanium-containing solid catalyst: the same as that in Embodiment 1

(3) Experiment of propylene polymerization

To a 2 L stainless steel autoclave that had been fully rinsed by gaseous propylene, 5 ml, 2.4 mol/L triethylaluminum solution, 1.8 mmol synthesized dithienyldiethoxysilane as the external electron donor compound, 23.6 mg titanium-containing solid catalyst component prepared above and 500 g liquid propylene were added in sequence, heated up to 70° C. and reacted for 0.5 hour at this temperature, cooled, released and discharged, to provide the polypropylene product.

Embodiment 8

(1) Synthesis of dithienyldimethoxysilane: the same as that in Embodiment 6

(2) Preparation of the titanium-containing solid catalyst: the same as that in Embodiment 1

(3) Experiment of propylene polymerization

To a 2 L stainless steel autoclave that had fully rinsed by gaseous propylene, first, hydrogen gas was charged at the normal pressure, until the pressure in the autoclave reached 0.1 MPa, and then 5 ml, 2.4 mol/L triethylaluminum solution, 0.9 mmol synthesized dithienyldiethoxysilane as the external electron donor compound, 27.3 mg titanium-containing solid catalyst component prepared above and 500 g liquid propylene were added in sequence, heated up to 70° C. and reacted for 0.5 hour at this temperature, cooled, released and discharged, to provide the polypropylene product.

Embodiment 9

(1) Synthesis of 3-methylthienyl-thienyldimethoxysilane

Figure 5:
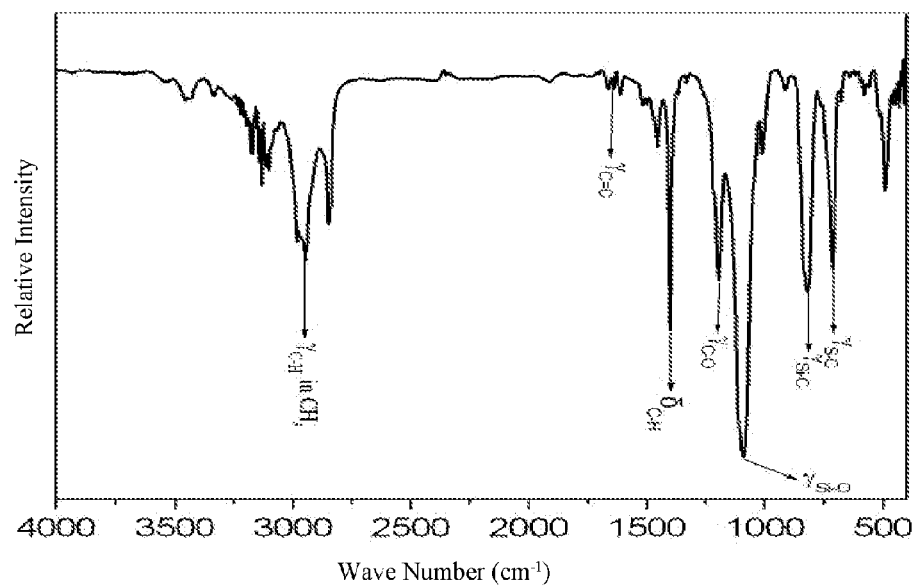
FIG. 5 is an infrared spectrum of 3-methylthienyl-thienyldimethoxysilane.
Figure 6:
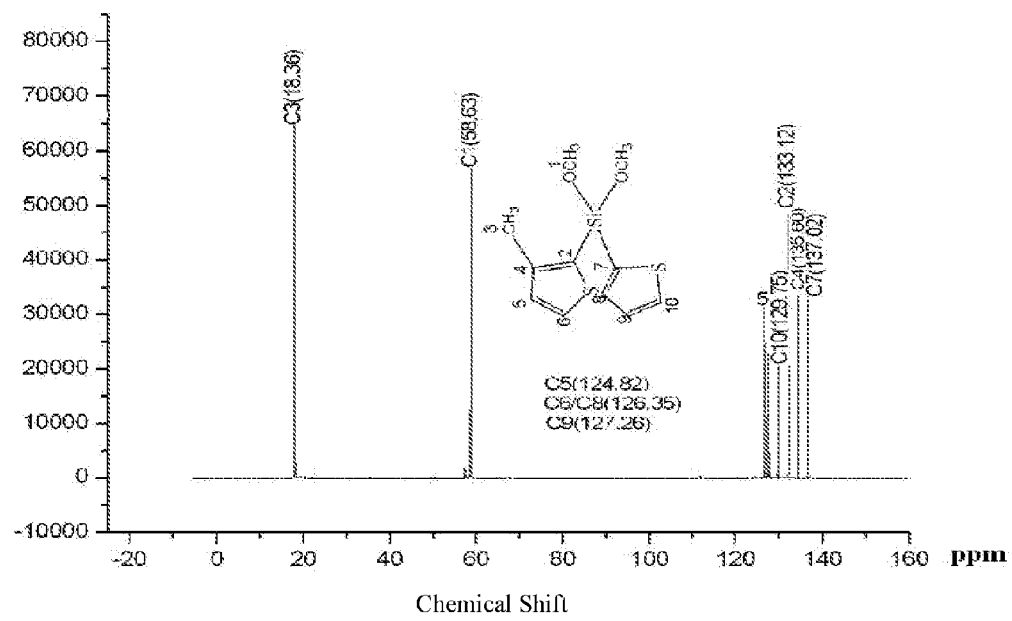
FIG. 6 is a $^{13}C$ nuclear magnetic resonance spectrum of 3-methylthienyl-thienyldimethoxysilane.

With protection of nitrogen gas, to a dry 250 ml three-necked flask that had been rinsed by nitrogen and equipped with a reflux condenser tube and a constant pressure dropping funnel, 5 g magnesium powder, 30 ml tetrahydrofuran and 13.47 ml tetramethoxysilane were added. 9 ml 2-bromothiophene was added to the dropping funnel. An appropriate amount of pure bromothiophene was added dropwise as the initiation material with stirring, and tetrahydrofuran was automatically boiled and refluxed. If no reaction occurred, a small amount of iodine was added for initiation. To the remaining 2-bromothiophene, 30 ml tetrahydrofuran was added for dilution to formulate a solution to be added dropwise. After the reaction was initiated, the ingredients were added dropwise within about 2 hours, and the charging rate was controlled such that tetrahydrofuran was slightly boiled. After dropping addition, the reactant was heated in an oil-bath at to 30° C. to 40° C. and reacted for 7 hours at this temperature. To the dropping funnel, 10 ml 3-methyl-2-bromothiophene was added, and 30 ml tetrahydrofuran was added for dilution to formulate a solution to be added dropwise. The ingredients were added dropwise within about 2 hours, and the charging rate was controlled such that tetrahydrofuran was slightly boiled. After dropping addition, the reactant was heated in an oil-bath to 30° C. to 40° C. and reacted for 6 hours at this temperature to allow magnesium powder to be reacted completely. After the reaction was completed, the reactant was cooled and left to stand, filtered by suction with protection of nitrogen gas, and the cake was washed, and the resulted filtrate was subjected to distillation at normal pressure and then subjected to distillation at reduced pressure. The distillates at 125° C. to 126° C. and 20 mmHg column pressure were collected, and subjected to elementary analysis, infrared spectrum and $^{13}C$ nuclear magnetic resonance test. The infrared spectrum and nuclear magnetic resonance spectrum are shown in FIG. 5 and FIG. 6 respectively. The infrared spectrum preliminarily approves the occurrence of the synthetic reaction, and the $^{13}C$ nuclear magnetic resonance spectrum effectively demonstrates the formation of the products. The results of elementary analysis indicates that, in the synthesized products, the content of C is 48.09% and the content of H is 5.56%, which are substantially identical with the theoretical C content of 48.89% and theoretical H content of 5.19% of 3-methylthienyl-thienyldimethoxysilane, thereby further approving the synthesis of the product 3-methylthienyl-thienyldimethoxysilane.

(2) Preparation of titanium-containing solid catalyst: the same as in Embodiment 1

(3) Experiment of propylene polymerization

To a 2 L stainless steel autoclave that had been fully rinsed by gaseous propylene, 5 ml, 2.4 mol/L triethylaluminum solution, 0.9 mmol synthesized 3-methylthienyl-thienyldimethoxysilane as the external electron donor compound, 27.7 mg titanium-containing solid catalyst component prepared above and 500 g liquid propylene were added in sequence, heated up to 70° C. and reacted for 0.5 hour at this temperature, cooled, released and discharged, to provide the polypropylene product.

Embodiment 10

(1) Synthesis of 3-methylthienyl-thienyldimethoxysilane: the same in Embodiment 9

(2) Preparation of titanium-containing solid catalyst: same as in Embodiment 1.

(3) Experiment of for propylene polymerization

To a 2 L stainless steel autoclave that had been fully rinsed by gaseous propylene, 5 ml, 2.4 mol/L triethylaluminum solution, 1.8 mmol synthesized 3-methylthienyl-thienyldimethoxysilane as the external electron donor compound, 21.8 mg titanium-containing solid catalyst component prepared above and 500 g liquid propylene were added in sequence, heated up to 70° C. and reacted for 0.5 hour at this temperature, cooled, released and discharged, to provide the polypropylene product.

Embodiment 11

(1) Synthesis of 3-methylthienyl-thienyldimethoxysilane: the same as in Embodiment 6

(2) Preparation of titanium-containing solid Catalyst: the same as in Embodiment 1

(3) Experiment of propylene polymerization

To a 2 L stainless steel autoclave that had been fully rinsed by gaseous propylene, first, hydrogen gas was charged at normal pressure, until the pressure in the autoclave reached 0.1 MPa, and then 5 ml, 2.4 mol/L triethylaluminum solution, 0.9 mmol synthesized 3-methylthienyl-thienyldimethoxysilane as the external electron donor compound, 23.4 mg titanium-containing solid catalyst component prepared above and 500 g liquid propylene were added in sequence, heated up to 70° C. and reacted for 0.5 hour at this temperature, cooled, released and discharged, to provide the polypropylene product.

Comparative Example 1

The titanium-containing solid catalyst component and polymerization method the same as those in Embodiment 1 were used, except that the external electron donor compound was changed to dicyclopentyldimethoxysilane.

Comparative Example 2

The titanium-containing solid catalyst component and the external electron donor dicyclopentyldimethoxysilane the same as those in Comparative Example 1 were used, and the polymerization method the same as that in Embodiment 5 was used, that is, 0.1 MPa hydrogen gas was added to the autoclave before polymerization.

Comparative Example 3

The titanium-containing solid catalyst component and polymerization method the same as those in Embodiment 1 were used, except that the external electron donor compound was changed to cyclohexylmethyldimethoxysilane.

Comparative Example 4

The titanium-containing solid catalyst component and polymerization method the same as those in Embodiment 1 were used, except that the external electron donor compound was changed to phenyltriethoxysilane.

It can be seen from the results of polymerization experiments in Table 1 that, by using the organosiloxane compounds containing two thienyl substituents according to the present invention as the external electron donor, the isotacticity of the resulting polymers is significantly higher than that of the polymer obtained by using the known typical organosiloxane external electron donor in the comparative example, especially in the case of no hydrogenation occurs.

(B) an aluminum alkyl compound component; and
(C) an organosiloxane compound component comprising two thienyl substituents, selected from at least one of compounds represented by general formula (I) below:

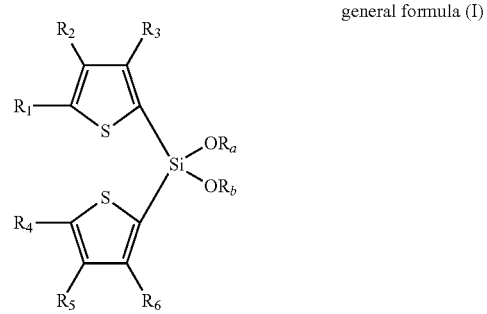

general formula (I)

wherein $R_1$ to $R_6$ are the same or different, and are selected from hydrogen, halogen, a linear or branched $C_1$-$C_{20}$ alkyl, a $C_3$-$C_{20}$ cycloalkyl, a $C_6$-$C_{20}$ aryl, a $C_7$-$C_{20}$ alkylaryl, or a $C_7$-$C_{20}$ aralkyl; and two or more of $R_1$ to $R_6$ may be bonded with each other to form a saturated or unsaturated condensed ring structure which may be substituted by a group having the same definition as $R_1$ to

TABLE 1

| Embodiment | External electron donor | Al/Si | Hydrogen gas (MPa) | Polymerization activity kgPP/gcat/0.5 h | Isotacticity % | Melting index g/10 min, 2.16 kg |
|---|---|---|---|---|---|---|
| Embodiment 1 | Dithienyldimethoxysilane | 13.3 | 0 | 4.9 | 98.8 | 0.481 |
| Embodiment 2 | Dithienyldimethoxysilane | 13.3 | 0 | 5.2 | 99.1 | 0.322 |
| Embodiment 3 | Dithienyldimethoxysilane | 26.7 | 0 | 5.4 | 98.2 | 0.516 |
| Embodiment 4 | Dithienyldimethoxysilane | 6.7 | 0 | 4.1 | 99.2 | 0.425 |
| Embodiment 5 | Dithienyldimethoxysilane | 13.3 | 0.1 | 3.3 | 96.4 | 19.5 |
| Embodiment 6 | Dithienyldiethoxysilane | 13.3 | 0 | 3.9 | 98.0 | 0.413 |
| Embodiment 7 | Dithienyldiethoxysilane | 6.7 | 0 | 3.7 | 98.3 | 0.402 |
| Embodiment 8 | Dithienyldiethoxysilane | 13.3 | 0.1 | 5.1 | 95.6 | 67.8 |
| Embodiment 9 | 3-methylthienyl-thienyldimethoxysilane | 13.3 | 0 | 4.5 | 98.7 | 0.162 |
| Embodiment 10 | 3-methylthienyl-thienyldimethoxysilane | 6.7 | 0 | 4.0 | 99.1 | 0.157 |
| Embodiment 11 | 3-methylthienyl-thienyldimethoxysilane | 13.3 | 0.1 | 3.6 | 95.4 | 20.7 |
| Comparative Example 1 | Dicyclopentyldimethoxysilane | 13.3 | 0 | 9.8 | 98.9 | 0.031 |
| Comparative Example 2 | Dicyclopentyldimethoxysilane | 13.3 | 0.1 | 13.9 | 98.7 | 4.91 |
| Comparative Example 3 | Cyclohexylmethyldimethoxysilane | 13.3 | 0 | 6.1 | 98.3 | 0.691 |
| Comparative Example 4 | Phenyltriethoxysilane | 13.3 | 0 | 5.4 | 97.7 | 0.202 |

INDUSTRIAL APPLICABILITY

According to the present invention, in the olefin polymerization catalyst containing thienyl-substituted silane, the organosiloxane compound containing two thienyl substituents is used as the external electron donor for catalytic polymerization of olefin. Especially when being used in propylene polymerization, the isotacticity of the polymerization product is very high, and the yield is high.

What is claimed is:

1. An olefin polymerization catalyst comprising a thienyl-substituted silane, wherein the catalyst is a product of a reaction of the following components:
(A) a solid titanium catalyst component, wherein titanium, magnesium, and halogen are main components of the solid titanium catalyst component;

$R_6$; $R_1$ to $R_6$ optionally contain one or more heteroatoms substituting carbon or hydrogen atoms or both, and the heteroatom is selected from nitrogen, oxygen, sulfur, silicon, phosphorus or a halogen atom; $R_a$ and $R_b$ are the same or different, and are selected from linear or branched $C_1$-$C_4$ alkyl; and
a molar ratio of the components in the catalyst is 1:50-150:5-50, based on titanium:aluminum:silicon.

2. The olefin polymerization catalyst comprising a thienyl-substituted silane according to claim 1, wherein in general formula (I) representing the organosiloxane compound comprising two thienyl substituents, $R_1$ to $R_6$ are the same or different, and are selected from hydrogen, methyl, ethyl, propyl or isopropyl.

3. The olefin polymerization catalyst comprising a thienyl-substituted silane according to claim 1, wherein in general formula (I) representing the organosiloxane compound comprising two thienyl substituents, $R_a$ and $R_b$ are the same or different, and are methyl or ethyl.

4. The olefin polymerization catalyst comprising thienyl-substituted silane according to claim 1, wherein the organosiloxane compound comprising two thienyl substituents is synthesized as follows: magnesium powder, a first amount of halogenated thiophene and a tetrahydrofuran solvent are mixed and refluxed under an inert atmosphere, followed by addition of an iodine initiator; a mixed solution containing halogenated thiophene, tetrahydrofuran and tetraalkoxysilane is added, and the mixture is heated, stirred and refluxed for a period of time, then cooled to room temperature, filtered, washed, and distilled at at a pressure below atmospheric pressure to provide the organosiloxane compound comprising two thienyl substituents; wherein the first amount of halogenated thiophene accounts for 3-20% by weight of the sum of the first amount and the second amount of halogenated thiophene, a molar ratio of tetraalkoxysilane to the sum of the first amount and the second amount of halogenated thiophene is 1:2-2.4; and a molar ratio of tetraalkoxysilane to the magnesium powder is 1:2-2.8.

5. A process for polymerizing or copolymerizing an olefin in the presence of the olefin polymerization catalyst comprising a thienyl-substituted silane according to claim 1, wherein the polymerization temperature is 50° C. to 100° C., and the polymerization pressure is normal pressure or higher.

* * * * *